(12) United States Patent
Moon et al.

(10) Patent No.: US 6,567,461 B1
(45) Date of Patent: May 20, 2003

(54) DEVICE AND METHOD FOR PERFORMING FRAME SYNC USING SYNC CHANNEL IN MOBILE COMMUNICATION SYSTEM

(75) Inventors: Hi-Chan Moon, Seoul (KR); Jong-Han Kim, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/398,598

(22) Filed: Sep. 17, 1999

(30) Foreign Application Priority Data

Sep. 17, 1998 (KR) .............................. 98-38919

(51) Int. Cl.$^7$ ............................................. H04L 27/30
(52) U.S. Cl. ...................... 375/145; 370/335; 370/342; 370/350
(58) Field of Search ................................ 370/335, 350, 370/342; 375/145

(56) References Cited

U.S. PATENT DOCUMENTS 5,511,067 A * 4/1996 Miller ........................ 370/335
5,943,361 A * 8/1999 Gilhousen et al. .......... 370/320
6,173,006 B1 * 1/2001 Kent et al. ................. 370/206

* cited by examiner

*Primary Examiner*—Daniel Hunter
*Assistant Examiner*—Alan T. Gantt
(74) *Attorney, Agent, or Firm*—Dilworth & Barrese, LLP (57) ABSTRACT

A base station transmitter for a CDMA communication system which includes a superframe period of a sync channel, a plurality of first sync channel frames segmented from the superframe period, the first sync channel frames each having a first period, and a plurality of second sync channel frames segmented from the first sync channel frames, the second sync channel frames each having a second period, wherein sync channel signals are transmitted through the second sync channel frames. The base station transmitter comprises a circuit for generating the sync channel signals; and a channel spreader for channel spreading a sync channel signal in a leading sync channel frame out of the second sync channel frames in said each first sync channel frame with a first orthogonal code, and channel spreading sync channel signals in the remaining sync channel frames with a second orthogonal code.

21 Claims, 10 Drawing Sheets

DEVICE AND METHOD FOR PERFORMING FRAME SYNC USING SYNC CHANNEL IN MOBILE COMMUNICATION SYSTEM

BACKGROUND OF THE INVENTION

1. Field of the Invention

The present invention relates generally to a synchronizing device and a synchronization method for a CDMA communication system, and in particular, to a synchronizing device and a method using spreading codes.

2. Description of the Related Art

Figure 1:
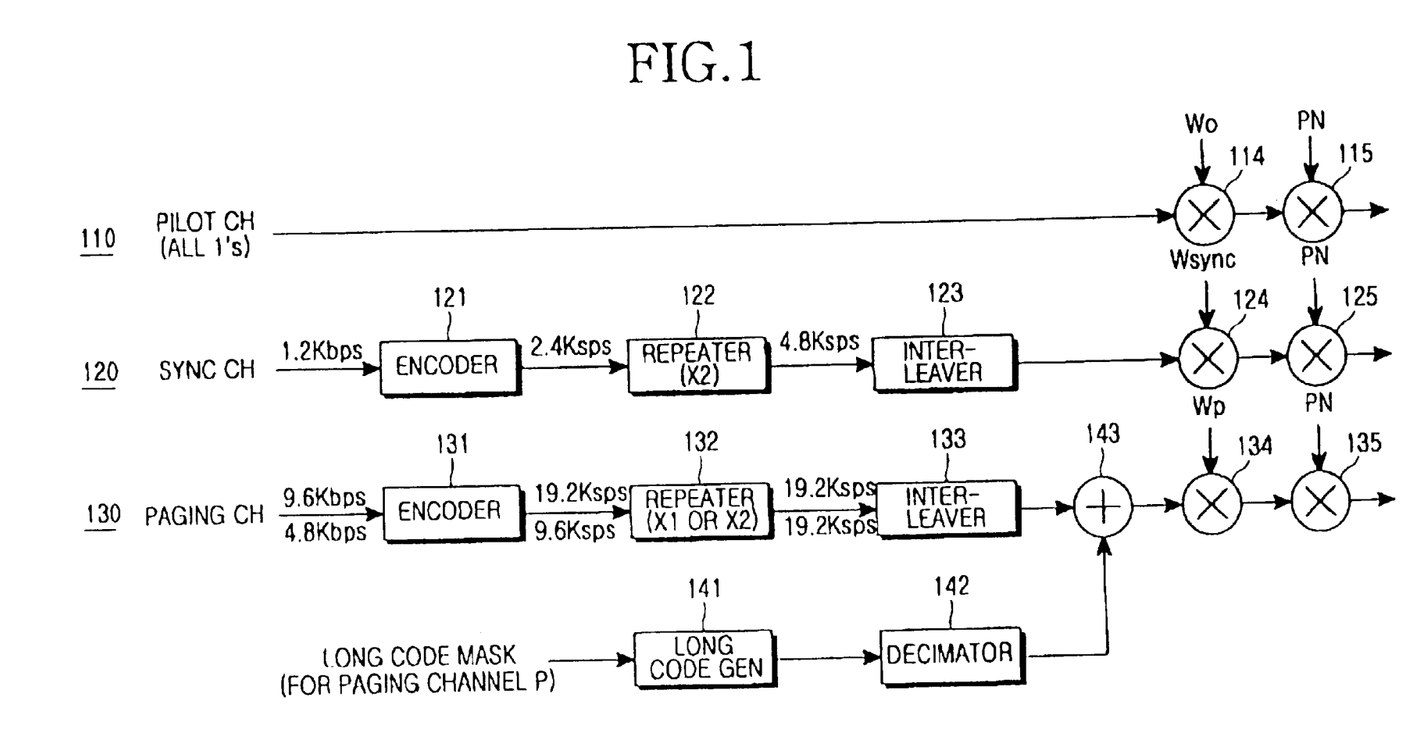
FIG. 1 is a diagram illustrating a forward link structure of a conventional CDMA communication system.

FIG. 1 illustrates an IS-95 forward link of a base station, for transmitting channel signals to a mobile station in a Code Division Multiple Access (CDMA) mobile communication system. As shown, in a CDMA mobile communication system, the forward link includes a pilot channel, a sync channel and a paging channel. Though not illustrated, the forward link further includes a traffic channel for transmitting the voice and data of a user.

Referring to FIG. 1, a pilot channel generator 110 generates a pilot channel signal comprised of all "1" s for a pilot channel, and a multiplier 114 multiplies the pilot channel signal by an orthogonal code $W_0$ to orthogonally spread the pilot channel signal. Here, a specific Walsh code is used for the orthogonal code $W_0$. A multiplier 115 multiplies the pilot channel signal output from the multiplier 114 by a PN (Pseudo Noise) sequence to spread the pilot channel signal.

With regard to the structure of a sync channel generator 120, a coding rate R=1/2, constraint length K=9 convolutional encoder can be used for an encoder 121. A repeater 122 repeats sync symbols output from the encoder 121 N times (N=2). An interleaver 123 interleaves the symbols output from the repeater 122 in order to prevent burst errors. A block interleaver is typically used for the interleaver 123. A multiplier 124 multiplies the sync channel signal by a specific orthogonal code assigned to the sync channel to orthogonally spread the sync channel signal. The sync channel outputs the positional information, standard time information and long code information of the base station, and also outputs information for system synchronization between the base station and a mobile station. As stated above, the sync channel generator 120 encodes an input sync channel signal, and multiplies the encoded sync channel signal by a specific Walsh code $W_{sync}$ assigned to the sync channel out of available Walsh codes to orthogonally spread the sync channel signal. A multiplier 125 multiplies the sync channel signal output from the multiplier 124 by the PN sequence to spread the sync channel signal.

With regard to a paging channel generator 130, an encoder 131 encodes an input paging channel signal. An R=1/2, K=9 convolutional encoder can be used for the encoder 131. A repeater 132 repeats the symbols output from the encoder 131 N times (N=1 or 2). An interleaver 133 interleaves the symbols output from the repeater 132 in order to prevent burst errors. A block interleaver is typically used for the interleaver 133. A long code generator 141 generates a long code which is the user identification code. A decimator 142 decimates the long code so as to match the rate of the long code to the rate of the symbol output from the interleaver 133. An exclusive OR gate 143 XORs the encoded paging signal output from the interleaver 133 and the long code output from the decimator 142 to scramble the paging signal. A multiplier 134 multiplies the scrambled paging signal output from the exclusive OR gate 143 by an orthogonal code $W_p$ assigned to the paging channel to orthogonally spread the paging signal. A multiplier 135 multiplies the paging channel signal output from the multiplier 134 by the PN sequence to spread the paging channel signal.

As stated above, the orthogonally spread transmission signals of the respective channels are multiplied by the PN sequence to be spread, and up-converted into an RF (Radio Frequency) signal to be transmitted. In the IS-95 standard, spreading is performed using two different PN sequences for the I and Q arms. The PN sequences used herein have a period of 32,768.

In the forward link structure of FIG. 1, the pilot channel does not carry data and spreads a signal of all "1" s with a PN sequence of period 32,768 to transmit. In a system having a chip rate of 1.2288 Mcps (chips per second), one PN sequence period corresponds to 26.7 msec (80/3 msec). Upon power-on, the receiver in a mobile station acquires the pilot channel signal on the forward link shown in FIG. 1 in order to acquire synchronization with a base station.

Figure 2:
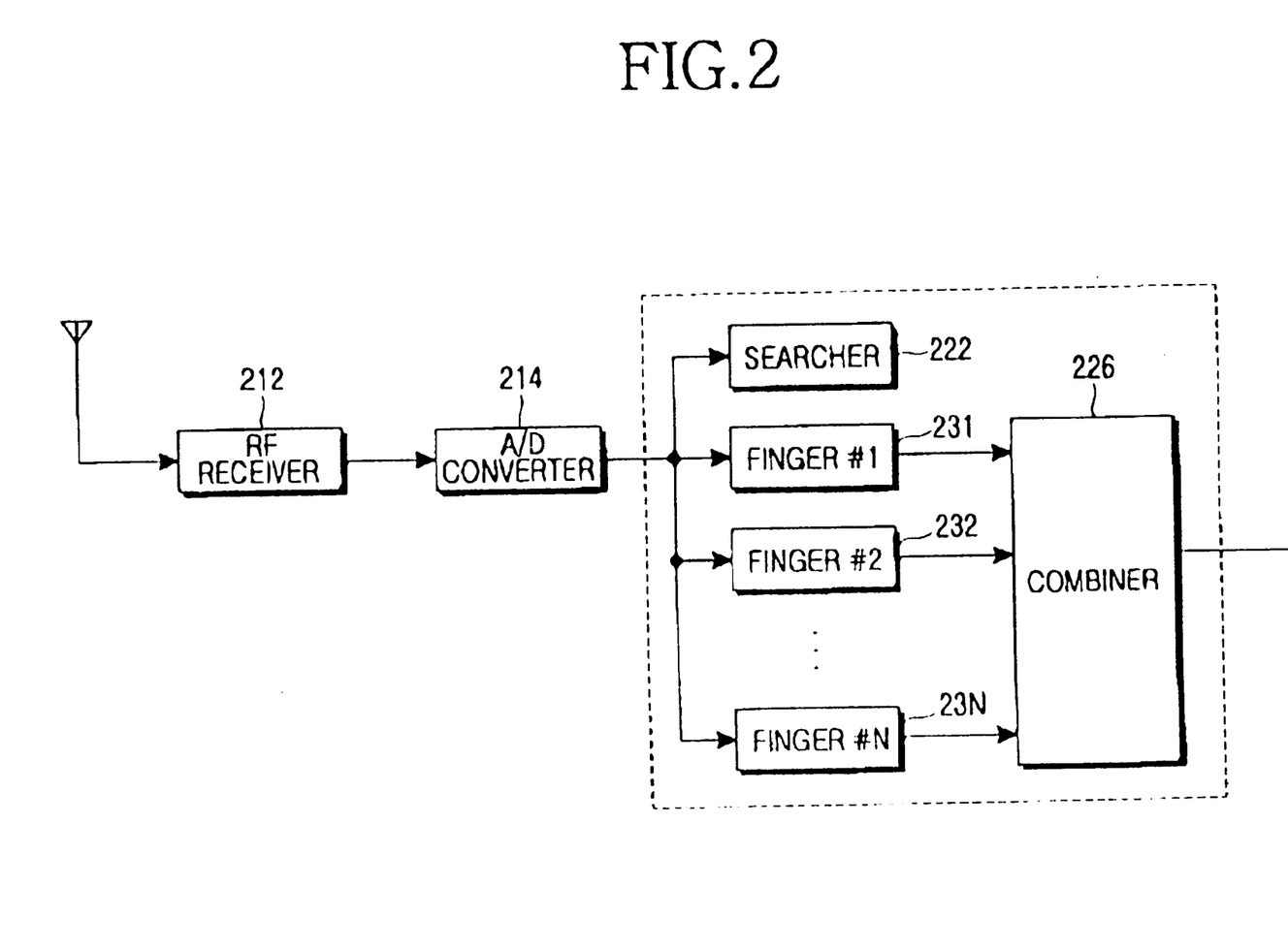
FIG. 2 is a receiver for a conventional CDMA communication system.

FIG. 2 illustrates a receiver in a mobile station, which receives forward link channel signals from a base station.

Referring to FIG. 2, an RF receiver 212 receives an RF signal transmitted from a base station and then down-converts the received RF signal into a baseband signal. An analog-to-digital (A/D) converter 214 converts the baseband signal output from the RF receiver 212 to digital data. A searcher 222 acquires the pilot channel signal out of the forward channel signals in order to synchronize the mobile station with the base station. N fingers 231–23N despread corresponding forward channel signals to detect a correlation value among the channel signals. A combiner 226 combines the output signals of the respective fingers 231–23N.

As illustrated in FIG. 2, a receiver of a mobile station is comprised of the searcher 222, the N fingers 231–23N and the combiner 226. Acquisition of the pilot channel signal is performed by the searcher 222.

Figure 3:
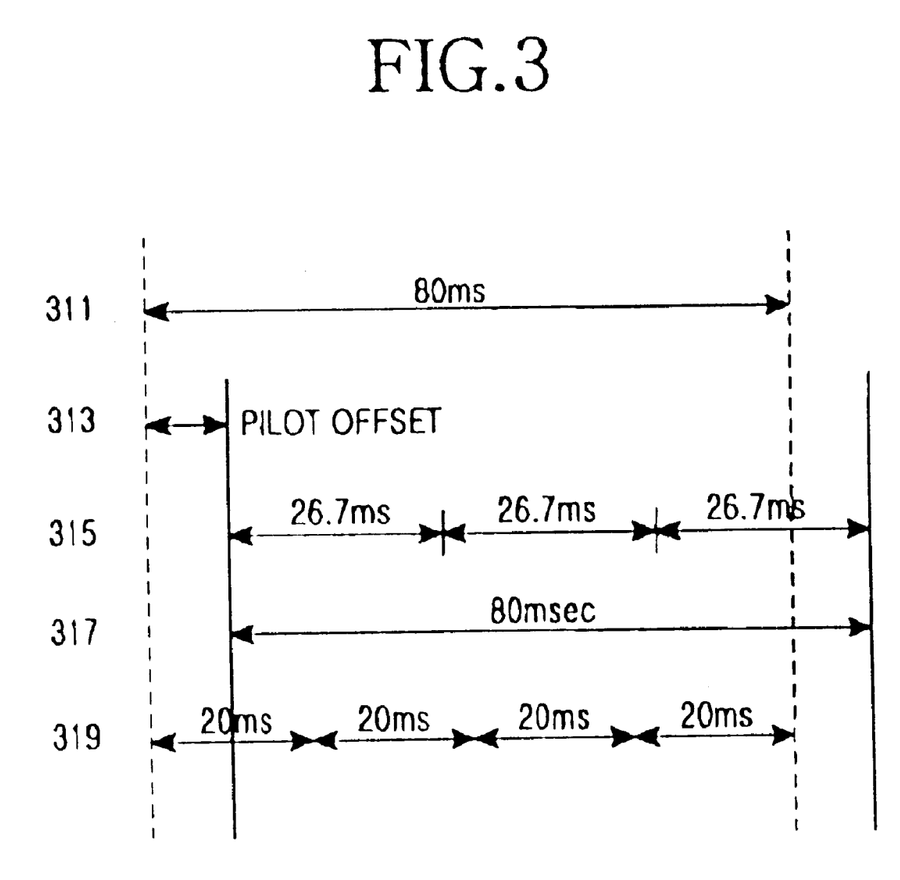
FIG. 3 is a timing diagram of a base station for a conventional CDMA communication system.

FIG. 3 is a timing diagram of forward channel signals that a base station transmits, in which the frame offset of a traffic channel is assumed to be 0.

Referring to FIG. 3, reference numeral 311 represents an 80 ms boundary of a base station, which is determined from a two-second boundary of the Global Positioning System (GPS). Reference numeral 313 represents the pilot offset of the base station. Reference numeral 315 represents the boundaries of three spreading sequence periods within 80 ms, from which it is clear that one spreading sequence period is 26.7 ms (80/3 ms). Herein, the spreading sequence is assumed to be a PN sequence. Each spreading sequence period is synchronized with a 26.7 ms frame boundary where a sync channel is interleaved. Here, the 80 ms frame will be referred to as the second frame and the 26.7 ms frame the first frame.

Reference numeral 317 represents an 80 ms frame boundary of the sync channel, while reference numeral 319 represents the frame boundaries of the paging channel and the traffic channel. For the traffic channel, the 80 ms frame is comprised of four 20 ms frames. Therefore, it is noted from FIG. 3 that in the 80 ms period, the sync channel is comprised of three 26.7 ms frames and the traffic channel is comprised of four 20 ms frames.

Figure 4:
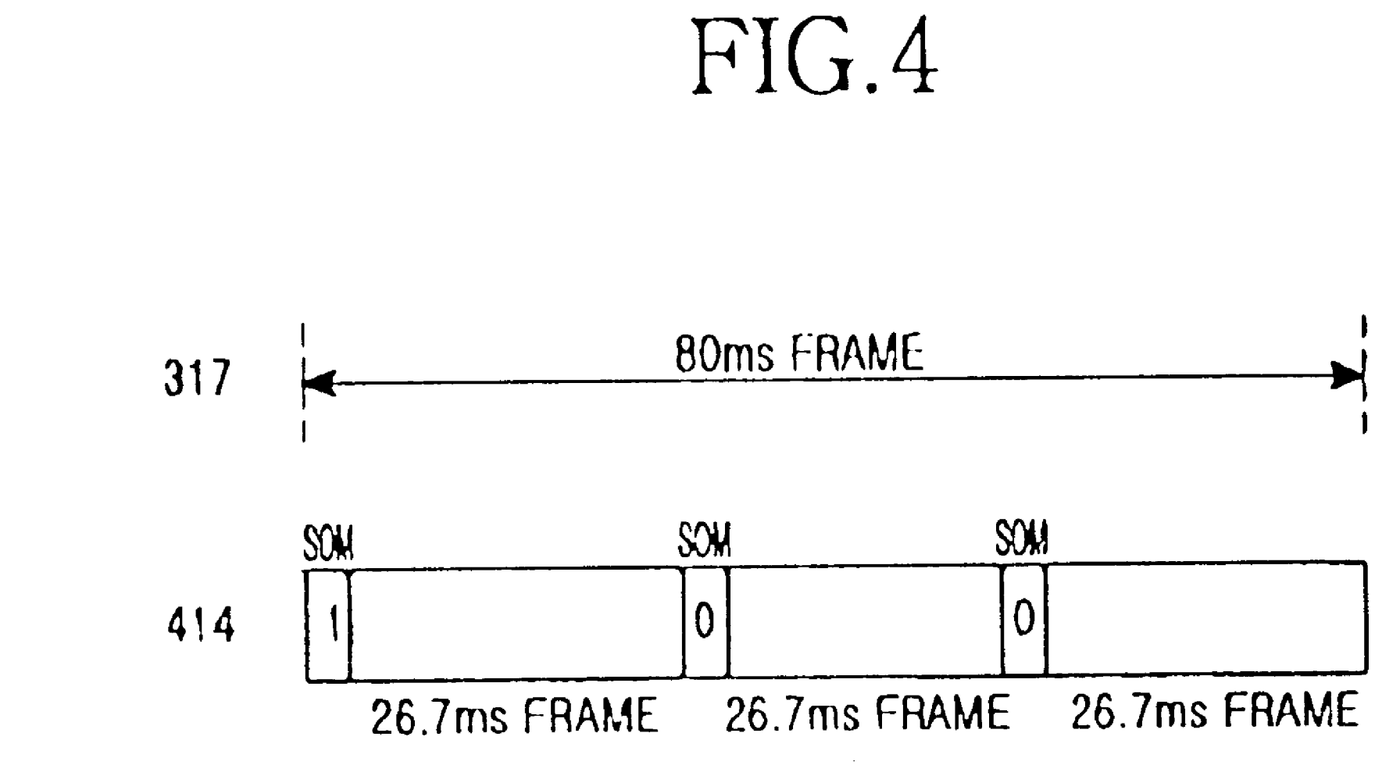
FIG. 4 is a diagram illustrating SOM bits on a sync channel.

FIG. 4 shows the 80 ms frame structure of the sync channel. For the sync channel signal, the 80 ms frame, represented by reference numeral 412, is comprised of three 26.7 ms frames each including a sync bit SOM (Start of Message) set according to a pilot sequence period. For example, in the 80 ms period, the sync bit SOM for the first 26.7 ms frame period is determined as "1" (or "0"), and the sync bits SOMs for the following 26.7 ms frames are determined as "0" (or "1"). Therefore, detecting a sync bit SOM of "1" (or "0") in the 80 ms period means detection of an 80 ms sync channel signal.

Referring to FIGS. 3 and 4, a description will be made regarding the synchronizing procedure performed between a base station and a mobile station. The standard timing of the base station is derived from the 80 ms boundary 311 which is determined from the two-second boundary of the GPS. The pilot channel signal of the base station is offset by the pilot offset 313 in the 80 ms boundary obtained from the GPS. This is to uniquely identify base stations using the same sequence by setting this pilot offset differently for each of the respective base stations. The pilot channel signals for the forward link are repeated at a period of 26.7 ms as represented by reference numeral 315. A sync channel signal is interleaved/deinterleaved at periods of 26.7 ms as represented by reference numeral 414, and this boundary is synchronized with one pilot sequence period (i.e., one PN sequence period). Therefore, upon acquiring a pilot channel signal, a mobile station in an IS-95 mobile communication system can accurately acquire the interleaving/ deinterleaving frame sync for a sync channel as shown in FIG. 4. That is, the 26.7 ms period represents one PN sequence period (i.e., sync frame), and the 80 ms period represents a superframe period of a sync channel.

Thereafter, the mobile station should acquire the 80 ms boundary 317 of the sync channel. The sync channel for the forward link transmits the sync bit SOM every 26.7 ms as represented by reference numeral 414. The SOM bit is set to "1" in the first 26.7 ms frame and to "0" in the following two 26.7 ms frames. The receiver of the mobile station becomes synchronized with the 80 ms boundary utilizing the SOM bits of the sync channel. The receiver of the mobile station synchronizes with the pilot channel in order to be synchronized with the base station, whereby the receiver demodulates a signal on the sync channel every 26.7 ms, and determines a 26.7 ms frame with the demodulated SOM bit of "1" as the start of an 80 ms boundary.

The forward link structure of FIG. 1 and the synchronization procedure of FIGS. 3 and 4 are applicable to an IS-95 mobile communication system having a chip rate of 1.2288 Mcps. However, for high-speed data transmission and effective system design, an IMT-2000 system will increase the chip rate to use the wider bandwidth.

It is expected that the IMT-2000 mobile communication system will use a chip rate which is higher by 3, 6 and 12 times the chip rate of the existing IS-95 system. Herein, it is assumed that the chip rate of the IMT-2000 system increases to 3.6864 Mcps, three times the chip rate of the IS-95 system. In this case, if a PN sequence having the same period as that of a spreading sequence for the existing IS-95 mobile communication system is used, one PN sequence period decreases by 1/3 times to be 80/9 ms. In that case, the procedure for acquiring the 80 ms sync for the sync channel becomes complicated. In particular, even though the mobile station initially acquires a pilot channel signal, since it does not know the boundary of the 26.7 ms frame, it is not possible to use the sync acquiring procedure used in the 1.2288 Mcps narrow band system.

One method for solving this problem is to use a spreading sequence having a period which is as long as the increase in the chip rate. For example, when the chip rate is increased by three times, the period of the spreading sequence is also increased by three times so as to maintain one spreading sequence period to be 26.7 ms. However, the increase in length of the PN sequence by three times causes an increase in initial acquisition time of the mobile station.

Therefore, when the chip rate increases beyond that of the existing IS-95 system, a new initial synchronization method will be required.

SUMMARY OF THE INVENTION

It is, therefore, an object of the present invention to provide a device and method for rapidly performing initial acquisition and frame synchronization of a received signal at a receiver in a spread spectrum communication system.

It is another object of the present invention to provide a device and method for rapid frame synchronization for a data frame using a spreading sequence having the same frame boundary during spreading in a receiver for a CDMA communication system.

To achieve the above objects, there is provided a base station transmitter for a CDMA communication system including a superframe period of a sync channel, a plurality of first sync channel frames segmented from the superframe period, the first sync channel frames each having a first period, and a plurality of second sync channel frames segmented from the first sync channel frames, the second sync channel frames each having a second period, wherein sync channel signals are transmitted through the second sync channel frames. The base station transmitter comprises a circuit for generating the sync channel signals; and a channel spreader for channel spreading a sync channel signal in a leading sync channel frame out of the second sync channel frames in said each first sync channel frame with a first orthogonal code, and channel spreading sync channel signals in the remaining sync channel frames with a second orthogonal code.

A superframe of a sync channel as used herein refers to a frame for acquiring frame sync in an initial sync acquisition process, and it is assumed to be 80 ms in the embodiment. A first sync channel frame refers to segmented frames of the superframe. Here, it will be assumed that the superframe is segmented into three first sync channel frames. In this case, the first sync channel frame is 26.7 ms. A second sync channel frame refers to segmented frames of the first sync channel frame. It will be assumed herein that the first sync channel frame is segmented into three second sync channel frames. In this case, the second sync channel frame is 8.89 ms.

The present invention provides a CDMA communication system that uses a spreading sequence having the same length as the spreading sequence used in an IS-95 system in order to rapidly acquire synchronization, even though the chip rate increases.

To this end, a base station according to a first embodiment of the present invention spreads a specific second sync channel frame duration in a first sync channel frame duration with a first channel spreading code and spreads the remaining second sync channel frame durations with a second channel spreading code, wherein the second sync channel frames are spread using the short (i.e., high rate) PN sequence. Therefore, a mobile station can perform initial acquisition by initially determining a sequence having a high chip rate and a correlation value and thereafter rapidly acquire a boundary of a first sync channel frame transmitted from the base station, thereby to acquire frame sync.

According to a second embodiment of the present invention, a base station spreads a specific second sync channel frame duration with a first channel spreading code at a boundary of the superframe duration of the sync channel and spreads the remaining superframe duration of the sync channel with a second channel spreading code, wherein the second sync channel frames are spread using the short PN sequence. Therefore, a mobile station can perform initial acquisition by initially determining a sequence having the highest chip rate and a correlation value and thereafter rapidly acquire a boundary of the superframe of the sync channel transmitted from the base station, thereby to acquire frame sync.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

It will be assumed herein that a chip rate increases from 1.2288 Mcps to 3.3864 Mcps. In this case, the PN sequence period becomes shorter from 26.7 ms (80/3) to 8.89 ms (80/9).

Figure 5:
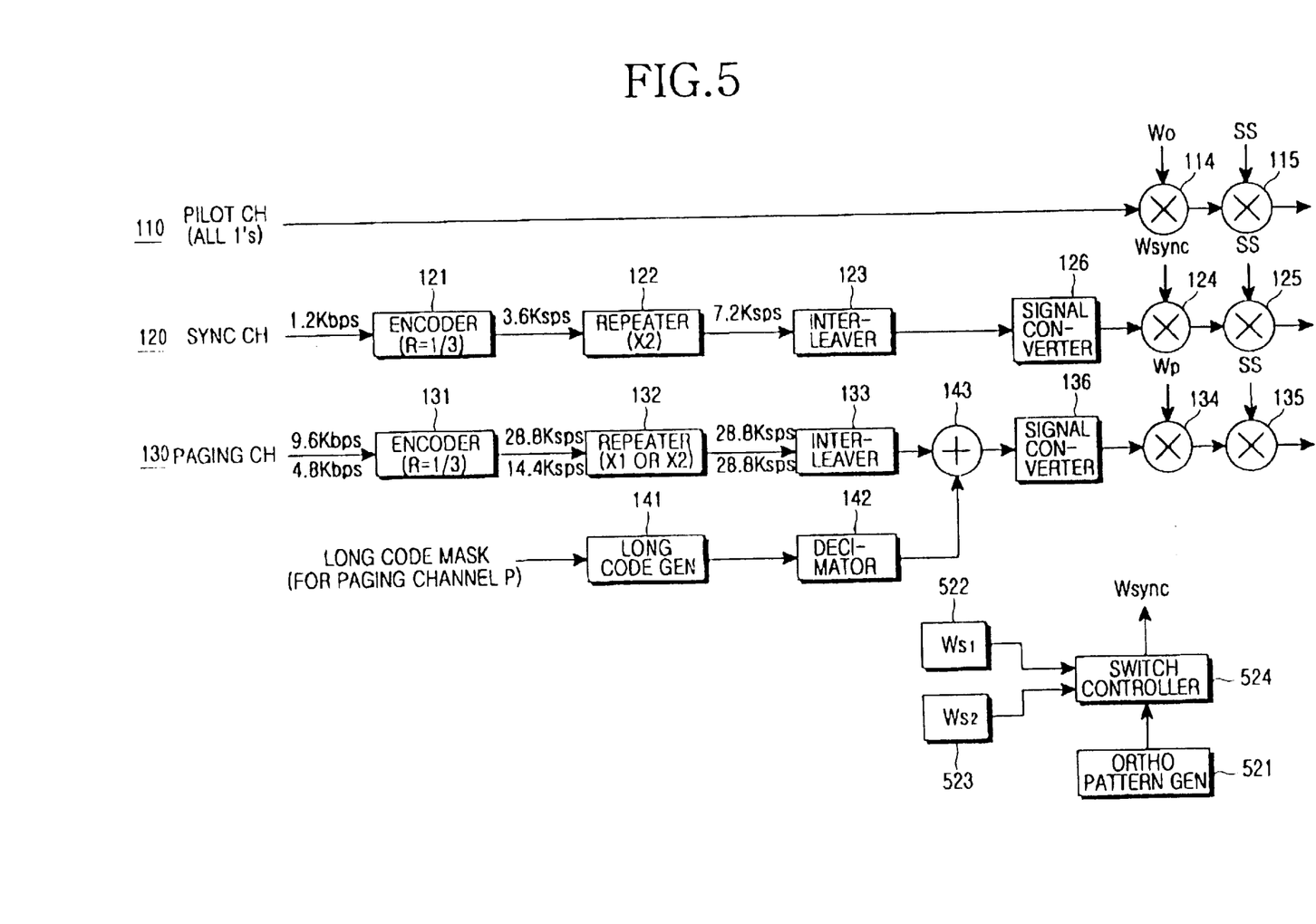
FIG. 5 is a diagram illustrating a forward link structure for a CDMA communication system according to an embodiment of the present invention.
Figure 6:
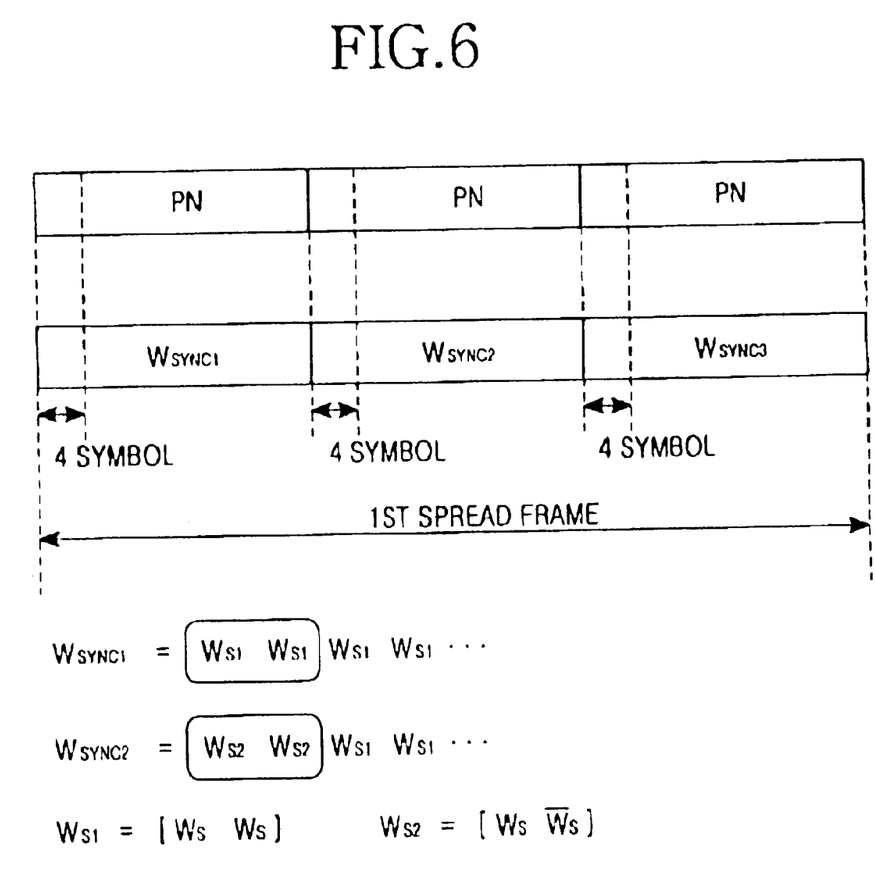
FIG. 6 is a diagram illustrating an orthogonal code set for a sync channel according to an embodiment of the present invention.
Figure 7:
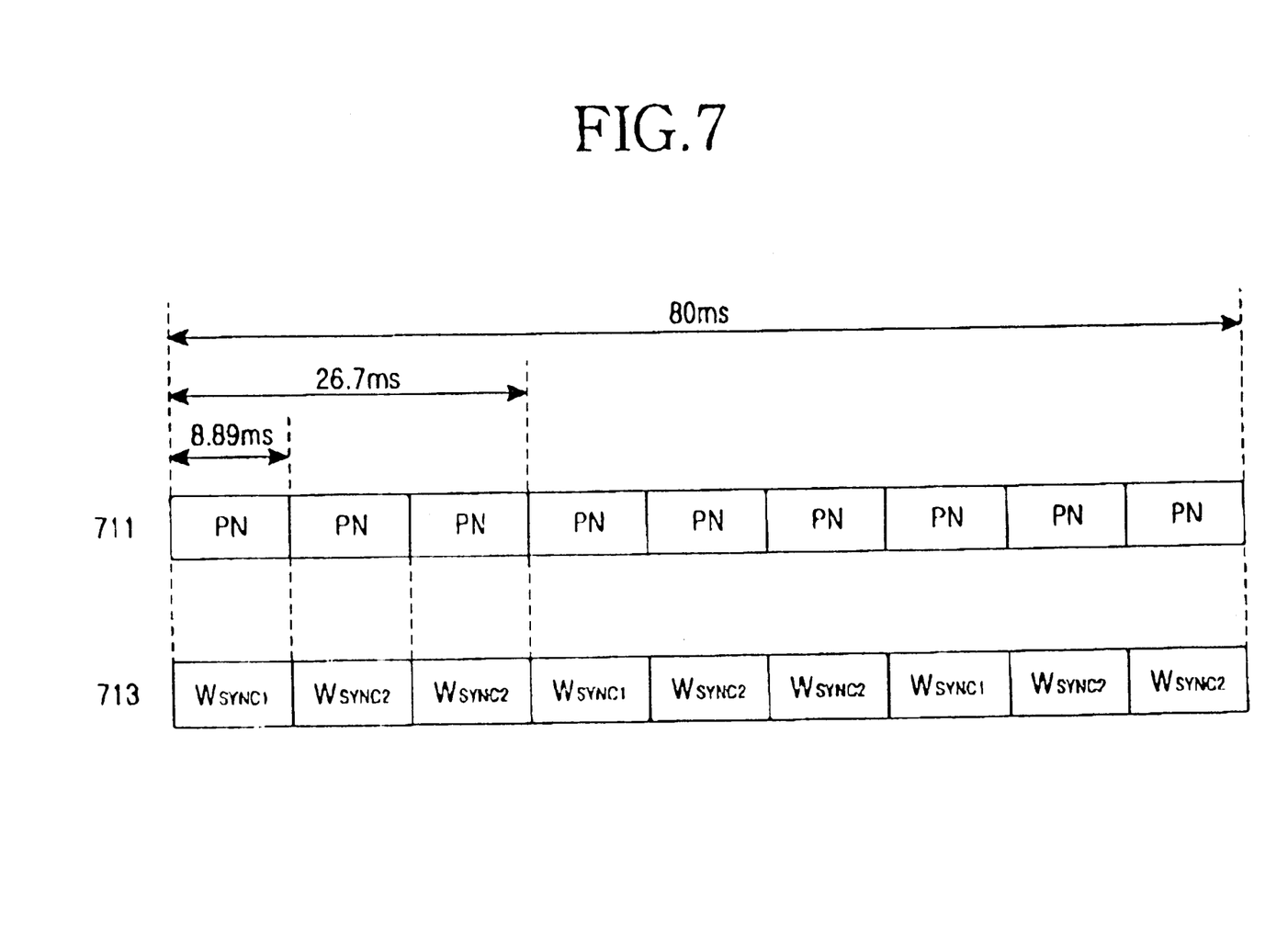
FIG. 7 is a diagram illustrating a sync channel structure and a spreading sequence structure according to an embodiment of the present invention.

Referring to FIG. 5, there is shown a base station transmitter for transmitting sync channel frames over a forward link. In addition, a sync channel frame duration according to an embodiment of the present invention becomes a second sync channel frame duration of 8.89 ms as shown in FIG. 7, and finally, signals for the second sync channel frame duration are distinguished by different orthogonal code sets as shown in FIG. 6.

A description of an embodiment will be made using an example in which the chip rate is 3.6864 Mcps. Therefore, in a preferred embodiment of the invention, a PN sequence period is $2^{15}$ (=32,768) chips. It is assumed in this embodiment that one PN sequence period is 8.89 ms (80/9 ms) which is 1/3 the existing PN sequence period. This means that the bandwidth of this embodiment is 3 times the bandwidth of the existing IS-95 mobile communication system. In the embodiments of the present invention, the 26.7 ms frame will be referred to as a first sync channel frame, the 80 ms frame will be referred to as a superframe, and the 8.89 ms frame will be referred to as a second sync channel frame.

In a CDMA mobile communication system according to an embodiment of the present invention, a base station transmitter maintains orthogonality at a specific duration or over the whole duration of every short PN sequence period (8.89 ms) of the sync channel, and performs spreading using an orthogonal code set whose pattern is repeated every 26.7 ms frame. A mobile station receiver then despreads a received signal on the sync channel using the specific orthogonal code set used in the base station transmitter and calculates energy of the received signal to determine a boundary of the 26.7 ms frame, and thereafter, detects sync bits of the sync channel at a start point of the 26.7 ms frame boundary to determine a boundary of the 80 ms frame, thereby performing initialization.

A. First Embodiment

FIG. 5 illustrates a base station transmitter for transmitting second sync channel frames segmented from a first sync channel frame according to an embodiment of the present invention. Herein, an orthogonal code, a channel spreading code and a Walsh code are all used as having the same meaning as a code for separating channels. In addition, a PN sequence and a spreading sequence are both used as having the same meaning as a code for PN masking a channel spread signal.

A pilot channel generator 110 produces a signal consisting of all "1" s (ones). Thereafter, a multiplier 114 multiplies the pilot channel signal by an orthogonal code $W_0$ to orthogonally spread the pilot channel signal. A multiplier 115 multiplies a pilot channel signal output from the multiplier 114 by a PN spreading sequence to generate a spread pilot channel signal.

With regard to a sync channel generator 120, an encoder 121 encodes 1.2 Kbps sync channel data input. Typically, an R=1/3, K=9 convolutional encoder can be used for the encoder 121. Therefore, the symbol rate of the coded data output from the encoder 121 becomes 3.6 Ksps (symbols per second). A repeater 122 repeats the sync symbols output from the encoder 121 N times (N=2). In this case, the symbol rate of the data output from the repeater 122 becomes 7.2 Ksps. An interleaver 123 interleaves the symbols output from the repeater 122 in order to prevent burst errors. A block interleaver can be used for the interleaver 123. A signal converter (or I/Q signal mapper) 126 converts symbol data of logic "0" and "1" output from the interleaver 123 to the levels "+1" and "−1", respectively, and then demultiplexes the level converted data to the I and Q arms.

First and second orthogonal code generators 522 and 523 generate first and second orthogonal codes $W_{S1}$ and $W_{S2}$, respectively. An orthogonal pattern generator 521 generates an orthogonal pattern for channel spreading an output signal of the sync channel generator 120. A switch controller 524 selects one of the first and second orthogonal codes $W_{S1}$ and $W_{S2}$ according to an output of the orthogonal pattern generator 521, to generate an orthogonal code $W_{sync}$ for the sync channel. A multiplier 124 multiplies an output signal of the sync channel generator 120, output from the signal converter 126, by the orthogonal code $W_{sync}$. That is, the multiplier 124 multiplies the sync channel signals for the I and Q arms output from the signal converter 126 by the orthogonal code $W_{sync}$ assigned to the sync channel to channel spread the sync channel signals.

The switch controller 524 selects the first orthogonal code $W_{S1}$, for the first 8.89 ms frame (i.e., second sync channel frame) duration which begins at a boundary of the 26.7 ms frame (i.e., first sync channel frame), and selects the second orthogonal code $W_{S2}$ for the remaining second and third 8.89 ms frame durations. Then, the multiplier 124 functions as a channel spreader for spreading a signal for the first second sync channel frame duration of 8.89 ms in the first sync channel frame duration of 26.7 ms with the first orthogonal code $W_{S1}$, and for spreading signals for the second and third second sync channel frame durations with the second orthogonal code $W_{S2}$. The multiplier 124 repeats the above operation at periods of 26.7 ms to generate a channel spread sync channel signal, thereby generating a channel spread signal for defining a boundary of the first sync channel frame of 26.7 ms. A multiplier 125 multiplies the output of the multiplier 124 by the PN spreading sequence to generate a spread sync channel signal.

The sync channel outputs the positional information, standard time information and long code information of the base station, and also outputs information for system synchronization between the base station and a mobile station. As stated above, the sync channel generator 120 encodes an input sync channel signal, and multiplies the encoded sync channel signal by a specific Walsh code $W_{sync[n]}$ assigned to the sync channel out of available Walsh codes to orthogonally spread the sync channel signal.

With regard to a paging channel generator 130, an encoder 131 encodes a 9.6 or 4.8 Kbps paging channel signal input. Typically, an R=1/3, K=9 convolutional encoder can be used for the encoder 131. Therefore, the rate of the symbols output from the encoder 131 becomes 28.8 Ksps or 14.4 Ksps. A repeater 132 repeats the symbols output from the encoder 131 N times (N=1 or 2). Specifically, the repeater 132 does not repeat the symbols for the symbol rate 28.8 Ksps, and repeats the symbols one time for the symbol rate 14.4 Ksps so as to output the symbols at the symbol rate 28.8 Ksps. An interleaver 133 interleaves the symbols output from the repeater 132 in order to prevent burst errors. A block interleaver is typically used for the interleaver 133.

A long code generator 141 generates a long code which is a user identification code. A decimator 142 decimates the long code so as to match the rate of the long code to the rate of the symbols output from the interleaver 133. An exclusive OR gate 143 XORs the encoded paging signal output from the interleaver 133 and the long code output from the decimator 142 to scramble the paging signal.

A signal converter (or I/Q signal mapper) 136 converts the symbol data of logic "0" and "1" output from the exclusive OR gate 143 to the levels "+1" and "−1",respectively, and then demultiplexes the level converted data to the I and Q arms. A multiplier 134 multiplies the scrambled paging signals for the I and Q arms, output from the signal converter 136, by an orthogonal code $W_p$ assigned to the paging channel to orthogonally spread the paging signals. A multiplier 135 multiplies the paging channel signal output form the multiplier 134 by the PN spreading sequence to generate a spread paging channel signal.

The multipliers 114, 124 and 134, functioning as channel spreaders, output the corresponding spread signals which are separated with the uniquely assigned orthogonal codes. In addition, the multipliers 115, 125 and 135, functioning as PN spreaders, add the channel spread signals output from the associated multipliers 114, 124 and 134, and then complex multiply the added signals by the PN sequence to generate PN spread signals. In the embodiment, the PN sequence has a high chip rate of 3.6864 Mcps.

FIG. 6 illustrates orthogonal codes $W_{sync[n]}$ for the sync channel according to an embodiment of the present invention, wherein orthogonal codes $W_{sync1}$ and $W_{sync2}$ are generated using the first and second orthogonal codes $W_{S1}$, and $W_{S2}$, respectively.

Referring to FIG. 6, the orthogonal code $W_{sync[n]}$ is an orthogonal code set that the switch controller 524 has newly created by switching the first and second orthogonal codes $W_{S1}$ and $W_{S2}$ output from the orthogonal code generators 522 and 523 according to the orthogonal pattern generated from the orthogonal pattern generator 521. The orthogonal pattern generator 521 outputs a signal of "0" and "1" as an orthogonal pattern for a specified duration, and the switch controller 524 then selects the first orthogonal code $W_{S1}$ when the output of the orthogonal pattern generator 521 is "0" and selects the second orthogonal code $W_{S2}$ when the output of the orthogonal pattern generator 521 is "1". The orthogonal codes $W_{S1}$ and $W_{S2}$ for spreading the sync channel, are created by either combining different short orthogonal codes or inverting same orthogonal codes, in order to maintain an orthogonality to each other. That is, in the embodiment, a receiver despreads the leading four symbols in the second sync channel frame duration of 8.89 ms with the orthogonal code, and determines a boundary of the sync channel frame according to the despreading results.

It is assumed that the embodiment uses an orthogonal code set for a sync channel shown in FIG. 6. For example, in FIG. 6, $W_{sync1}$ used for four symbols of the sync channel includes $W_{S1}$ and $W_{S1}$, and $W_{sync2}$ includes $W_{S2}$ and $W_{S2}$, where $W_{S1}=[W_S\ W_S]$; and $W_{S2}=[W_S\ \overline{W}_S]$. In the example of FIG. 6 embodiment, only four symbols are spread by $W_{S2}$ channelization code in $W_{syc1}$. But, this can be generalized to any symbol number, i.e., N symbols can be spread by Ws channelization code in $W_{sync1}$.

FIG. 7 illustrates a PN sequence and a sync channel transmitted from a base station transmitter according to an embodiment of the present invention. Referring to FIG. 7, reference numeral 711 represents a PN sequence generated at periods of 8.89 ms, and reference numeral 713 represents an orthogonally spread sync channel. Therefore, it is noted that the sync channel is transmitted three times for one frame period, wherein the sync channel is orthogonally spread with different orthogonal codes. In FIG. 7, the orthogonal codes $W_{sync1}$, $W_{sync2}$ and $W_{sync2}$ are repeatedly output every frame period, by way of example.

A description will now be made regarding how the sync channel generator 120 in the base station transmitter of FIG. 5 transmits the sync channel as shown in FIG. 7. A 1.2 Kbps sync channel signal is encoded by the encoder 121, and then converted to a 7.2 Kbps signal through the repeater 122 and the interleaver 123. Thereafter, the 7.2 Kbps signal is converted to a signal of "+1" and "−1" by the signal converter 126, and then multiplied by orthogonal code sets $W_{sync[n]}$ in the multiplier 124 to be orthogonally spread. The orthogonal code sets $W_{sync[n]}$ are generated such that orthogonal codes $W_{S1}$ and $W_{S2}$, which are orthogonal to each other, maintain an orthogonality between them according to an orthogonal pattern generated from the orthogonal pattern generator 521 for a short PN sequence duration of 8.89 ms (or over the whole duration), as shown in FIG. 6. The generated orthogonal code sets $W_{sync[n]}$ orthogonally spread the sync channel in such a manner that the repeated orthogonal code sets of $W_{sync1}$ $W_{sync2}$ and $W_{sync2}$ are synchronized to the first spreading sequence, as shown in FIG. 7. The multiplier 125 then multiplies the orthogonally spread sync channel by the PN sequence before transmission.

When a base station generates the first sync channel frame as described above, a base station receiver performs initial acquisition and synchronization for the received sync channel frame. More specifically, upon power-on, the mobile station receiver receives a pilot channel signal to acquire a PN spreading sequence. Acquisition of the PN sequence is performed by calculating a correlation value between a received signal and a locally generated PN sequence and then searching a location having the higher correlation value. In the conventional IS-95 mobile communication system, since one PN sequence period coincides with a frame where a sync channel is interleaved, synchronization of sync channel superframe of 80 ms is performed by the sync bits SOM by demodulating the sync channel. However, in the embodiment using a chip rate three times higher the conventional chip rate, if the PN spreading sequence having the same length as in the IS-95 system is used, one PN sequence period will be shorter than 26.7 ms which is a length of a frame where the sync channel is interleaved.

Therefore, after acquisition of a PN sequence, it is necessary to define a boundary of a first sync channel frame where sync channel data is interleaved, prior to modulating the sync channel. This procedure is performed using the characteristics that the sync channel is spread with the orthogonal code sets maintaining an orthogonality at a specific duration (or over the whole duration), in sync with the PN sequence period.

Figure 8:
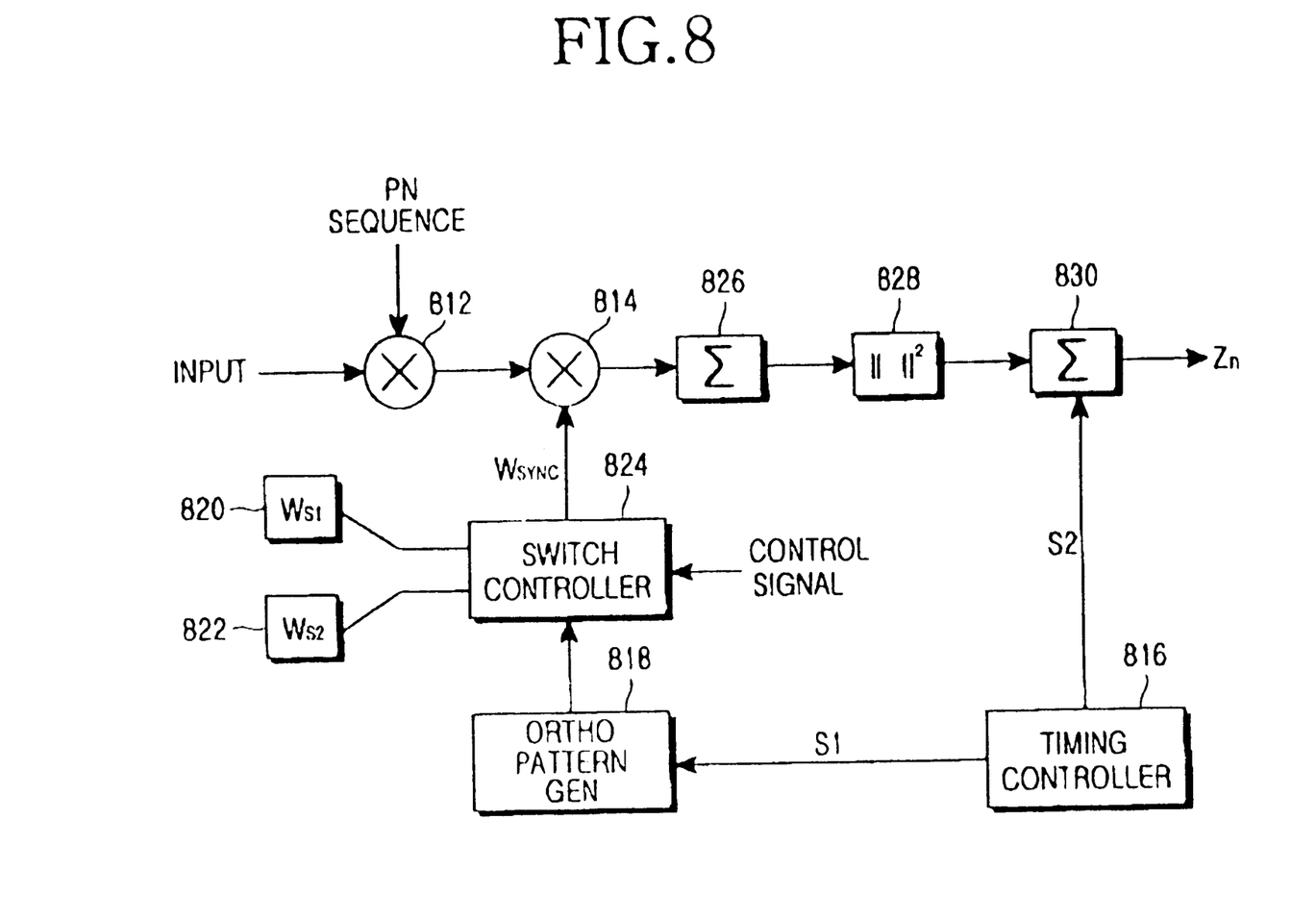
FIG. 8 is a diagram illustrating a receiver that calculates a decision variable using a received sync channel signal in a mobile station according to an embodiment of the present invention.

FIG. 8 illustrates a mobile station receiver for acquiring a short PN sequence and then detecting the boundary of a first sync channel frame according to an embodiment of the present invention.

Referring to FIG. 8, a multiplier 812 multiplies the received signal by the short PN sequence to despread the received signal. A multiplier 814 multiplies the PN despread signal output from the multiplier 812 by an orthogonal code $W_{sync}$ for a sync channel. First and second orthogonal code generators 820 and 822 generate first and second orthogonal codes $W_{S1}$ and $W_{S2}$, respectively. An orthogonal pattern generator 818 generates an orthogonal pattern set by a signal S1 output from a timing controller 816. A switch controller 824 selects one of the first and second orthogonal codes $W_{S1}$ and $W_{S2}$ according to the orthogonal pattern output from the orthogonal pattern generator 818 and outputs the selected orthogonal code as an orthogonal code $W_{sync}$ for the sync channel. Here, the first and second orthogonal generators 820 and 822, the orthogonal pattern generator 818 and the switch controller 824 have the same structures as those of the sync channel generator 120 in the base station transmitter of FIG. 5.

An accumulator 826 accumulates sync symbols for a symbol duration of the sync channel to demodulate the sync symbols. Therefore, a signal output from the accumulator 826 becomes a despread and orthogonally demodulated sync channel signal. A squarer 828 squares the integrated signal output from the accumulator 826 to convert the integrated signal to an energy signal. An accumulator 830 accumulates an input signal in response to a signal S2 generated from the timing controller 816. The timing controller 816 generates the signal S1 representing the beginning of the 8.89 ms frame, and the signal S2 representing an integrating duration of the 4-symbol duration beginning at the signal S1.

Figure 9:
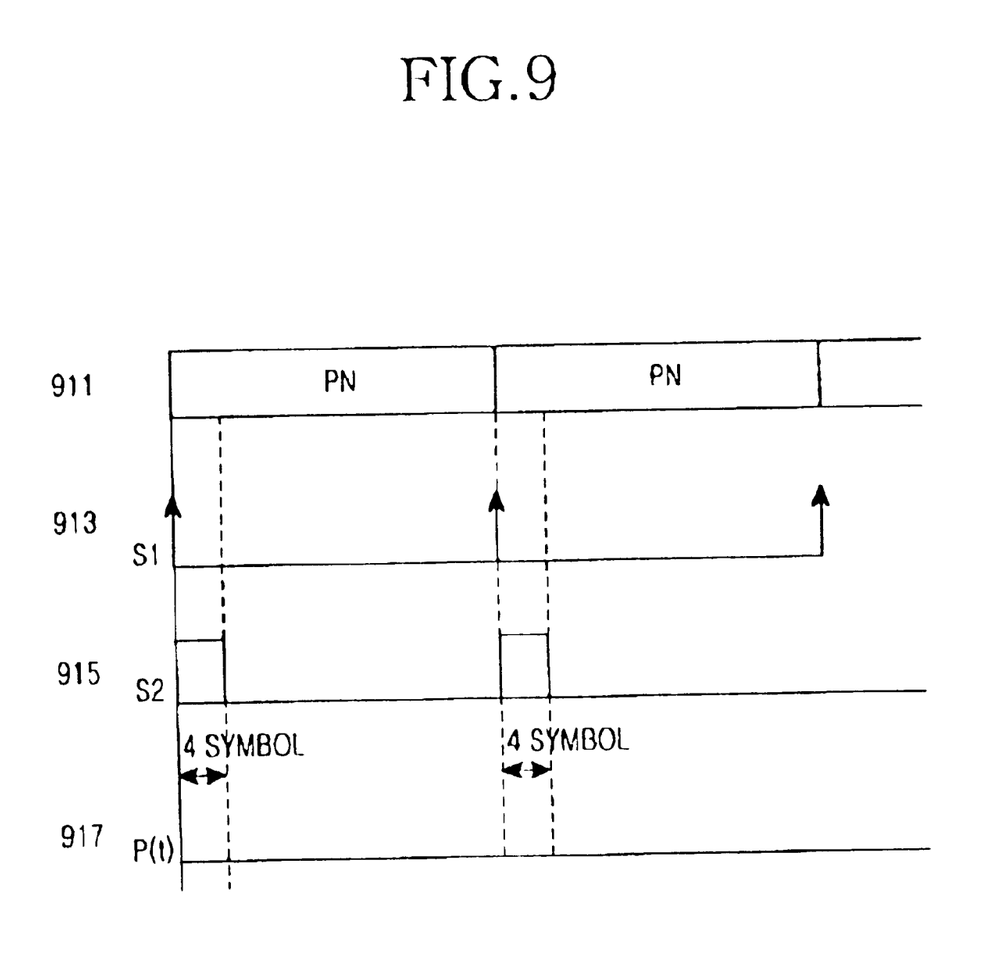
FIG. 9 is the timing diagram of the timing controller in the mobile station receiver of FIG. 8.

FIG. 9 is a diagram illustrating the timing of the timing controller 816 and an orthogonal pattern P(t) output from the orthogonal pattern generator 818. In FIG. 9, reference numeral 911 represents a boundary of a PN sequence, and reference numeral 913 represents the signal S1 which is a PN boundary signal generated at the boundary of the 8.89 ms frame. Further, reference numeral 915 shows the signal S2 which is activated for the 4-symbol duration beginning at the signal S1 which is generated at the boundary of the 8.89 ms frame. The S2 signal duration becomes a duration for integrating the despread sync channel. In addition, reference numeral 917 represents a signal P(t) which is an orthogonal pattern generated from the orthogonal pattern generator 818. In the embodiment, since the orthogonal code set $W_{sync}$ is used, "0" signal is generated for P(t) over the whole duration. Therefore, the orthogonal pattern generator 818 is enabled in response to the S1 signal from the timing controller 816 to generate an orthogonal pattern, and the accumulator 830 accumulates the output of the squarer 828 at the 4-symbol duration in response to the S2 signal.

Referring to FIGS. 8 and 9, a receiver despreads a received signal for a specific duration using a PN sequence and an orthogonal code set $W_{sync}$ for the sync channel. The squarer 828 and the accumulator 830 calculate energy of the despread signal, and the calculated energy value becomes a decision variable $Z_n$. The timing controller 816 generates the S1 signal representing a boundary of one PN sequence as shown by 913, and the S2 signal representing an accumulating duration where despreading is performed and energy is accumulated for N-symbol duration beginning at generation of the S1 signal. The S2 signal representing the energy accumulating duration for the despread symbols controls the accumulating duration of the accumulator 830. Further, the S1 signal representing one PN sequence period designates the beginning of the orthogonal pattern generated from the orthogonal pattern generator 818.

Assume that a sync channel of a mobile station according to an embodiment of the present invention has the structure of FIG. 9. That is, the sync channel 911 is spread with different orthogonal code sets $W_{sync}$ and $W_{sync2}$, in sync with the boundary of the 8.89 ms PN sequence. In addition, each orthogonal code set maintains the orthogonality of the first 4 symbols, as shown in FIG. 6. Further, the orthogonal codes are repeated in sync with the boundary of the first sync channel frame. FIG. 6 shows a sync channel in which the orthogonal codes are changed in sync with the first sync channel frame.

To search a boundary of the first sync channel frame, the first sync channel frame is first despread with an orthogonal code set $W_{sync1}$, which is identical to that used in the transmitter, in sync with the boundary of the 8.89 ms frame, and thereafter, energy is calculated for the leading N-symbol duration (where N=4) in accordance with Equation (1) below to obtain a decision variable $Z_n$.

$$Z_n = \sum_{l=0}^{N} \sum_{m=0}^{W_N} [(I_{l,m} + jQ_{l,m}) \oplus W_{sync1}(l, m)]^2 \quad (1)$$

where $I_{l,m}+jQ_{l,m}$ denotes an input signal, m denotes an integrating duration for the orthogonal code, and l denotes a symbol index. The calculated decision variable $Z_n$ has a high value at the beginning point of the first sync channel frame where the sync channel is interleaved, and has a value closely approximating to "0" at the other points. When the transmitter increases the integrating duration, the receiver can also increase the integrating duration for the symbols to increase accuracy of the decision variable $Z_n$. There are several methods for searching the boundary of the first sync channel frame based on the decision variable $Z_n$.

In a first method, the decision variable $Z_n$ is calculated every 8.89 ms spreading sequence period, and it is determined as the beginning of the frame where the sync channel is interleaved, when the calculated decision variable exceeds a threshold. In a second method, the decision variable $Z_n$ is calculated every 8.89 ms frame, and decision variables for all hypotheses are compared to determine a position having the highest value as the beginning of the frame where the sync channel is interleaved.

After determining the boundary of the first sync channel frame of the sync channel, the mobile station receiver decodes the sync channel signal in a unit of the first sync channel frame to detect a SOM bit of the sync channel. A boundary of the 80 ms frame of the sync channel is detected at the SOM bit of the sync channel to synchronize the timing of the receiver to the boundary of the 80 ms frame. This procedure is identical to that in the existing IS-95 system.

B. Second Embodiment

Reference will now be made to a frame boundary search method according to a second embodiment of the present invention.

In the frame boundary search method according to the first embodiment, data is transmitted using a spreading code having a period shorter in length than the first sync channel frame (26.7 ms), and then the boundary of the first sync channel frame is searched using a plurality of orthogonal codes. In the first embodiment, the boundary is searched while maintaining the boundary of the first sync channel frame where the sync channel is interleaved. However, in the second embodiment, the frame where the sync channel is interleaved is extended in length to an 80 ms superframe of the sync channel, and a boundary of the superframe is searched using a plurality of orthogonal codes. In this case, it is possible to increase performance by extending an interleaver length of the sync channel to 80 ms, and further, it is not necessary to perform decoding every first sync channel frame (26.7 ms).

Figure 10:
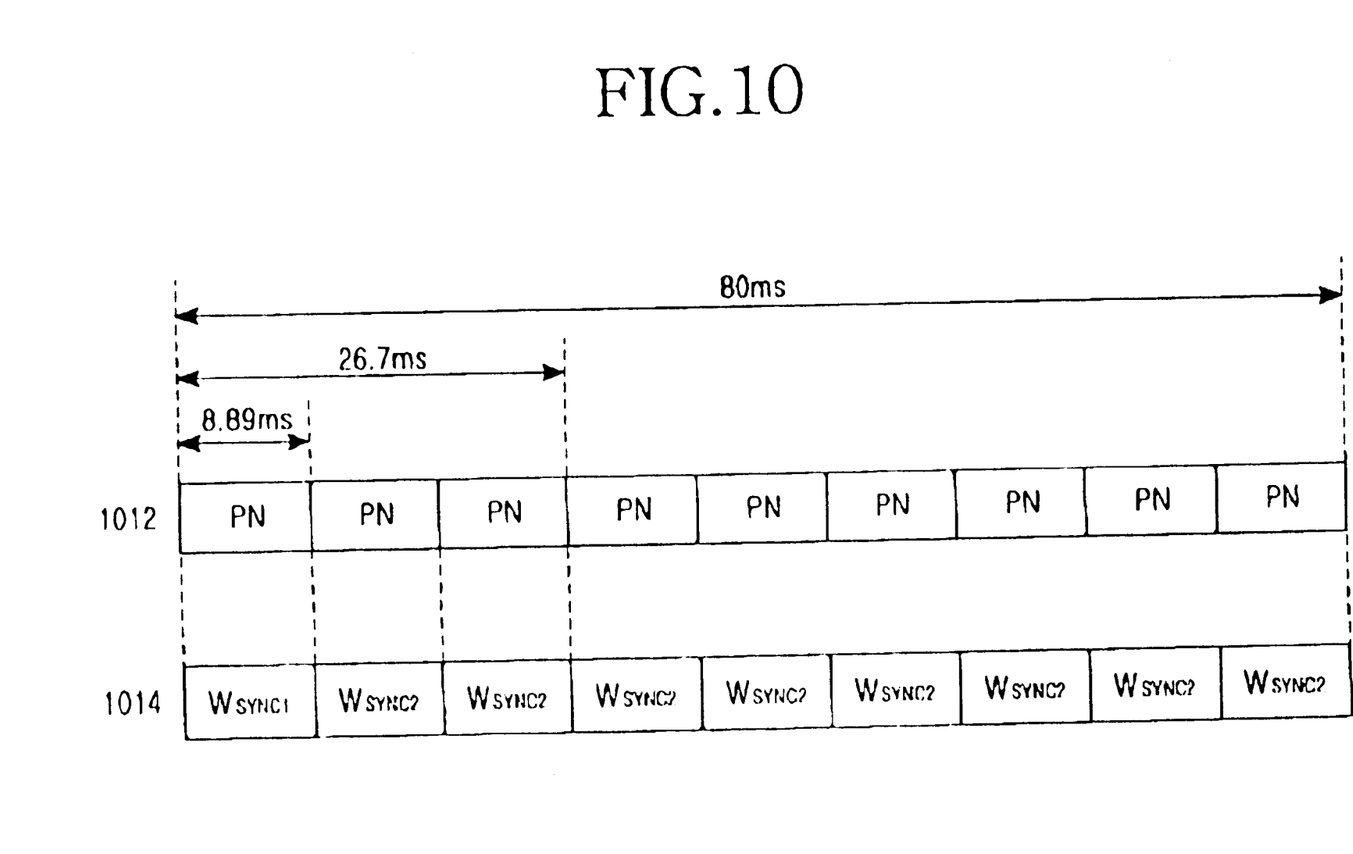
FIG. 10 is a diagram illustrating a format of a signal that a base station transmits when an interleaving size of a sync channel is extended, according to another embodiment of the present invention.

FIG. 10 illustrates a format of a signal that a base station transmits when an interleaving size of a sync channel is extended, according to the second embodiment of the present invention.

In the second embodiment, a base station transmitter has the structure shown in FIG. 5. However, in this embodiment, an orthogonal pattern output from the orthogonal pattern generator 521 is repeated at the periods of 80 ms frame, as shown in FIG. 10. Therefore, the second embodiment is similar to the first embodiment; the difference between the two embodiments is in that synchronization of the second spreading frame can be acquired even without using the SOM bit. In addition, in the second embodiment, interleaving of the sync channel can be extended in a unit of 80 ms frame.

With regard to an operation of the sync channel generator 120 according to the second embodiment, the switch controller 524 selects the first orthogonal code $W_{S1}$ for the first 8.89 ms frame (i.e., second sync channel frame) duration beginning at the boundary of the 80 ms frame (i.e., superframe of the sync channel), and selects the second orthogonal code $W_{S2}$ for the remaining second to ninth 8.89 ms frame (i.e., second sync channel frame) durations. Then, the multiplier 124 functions as a channel spreader which channel spreads a signal for the first second sync channel frame duration (8.89 ms) in the superframe duration (80 ms) of the sync channel with the first orthogonal code $W_{S1}$, and channel spreads signals for the second to ninth second sync channel frame duration with the second orthogonal code $W_{S2}$. Therefore, the multiplier 124 repeats the above operation at periods of 80 ms duration to generate the channel spread sync channel signals, thereby generating a channel spread signal for defining the boundary of the 80 ms superframe of the sync channel.

A description will be now made regarding an operation according to the second embodiment with reference to FIG. 10. Upon power-on, a receiver receives a short PN sequence of 8.89 ms. This is to acquire synchronization of the second sync channel frame of 8.89 ms. Thereafter, synchronization of the 80 ms frame is acquired utilizing the orthogonal characteristic of the orthogonal code sets for the sync channel. At this point, the receiver has the same operation as in the first embodiment. However, unlike the first embodiment, since the 80 ms frame includes nine spreading sequences of period 32768 as shown by reference numeral 1012, it is necessary to detect one of the nine spreading sequences, which has the highest decision variable. The receiver can either declare sync acquisition when the decision variable exceeds a threshold, or compare 9 (nine) possible decision variables to declare a position having the highest decision variable as the boundary of the 80 ms frame. For this, the receiver can have the structure shown in FIG. 8. In the second embodiment, since the boundary of the 80 ms frame can be acquired using the orthogonal characteristic of the orthogonal code sets, there is not required a process for performing frame sync using the SOM bit every first sync channel frame (26.7 ms).

As described above, in the novel spread spectrum communication system, a base station spreads a sync channel with an orthogonal code set made according to a specific orthogonal pattern to acquire frame sync, and a mobile station initially determines a short spreading sequence and a correlation value using a pilot channel to perform initial acquisition, despreads an N-symbol duration maintaining an orthogonality, beginning at a boundary of one short PN sequence period, using the sync channel, and determines energy to acquire synchronization of a traffic frame.

By doing so, it is possible to facilitate acquisition of frame sync while maintaining the existing sync channel structure. In addition, as described in the second embodiment, it is possible to remove the existing process of acquiring the 80 ms frame sync using the SOM bit, extend the interleaver length of the sync channel to 80 ms to improve performance, and prevent decoding performed every 26.7 ms.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station transmitter for a code division multiple access (CDMA) communication system including a superframe period of a sync channel, a plurality of first sync channel frames segmented from the superframe period, the first sync channel frames each having a first period, and a plurality of second sync channel frames segmented from the plurality of first sync channel frames, the second sync channel frames each having a second period, wherein sync channel signals are transmitted through the second sync channel frames, the base station transmitter comprising:

a circuit for generating sync channel signals; and a channel spreader for channel spreading a sync channel signal in a leading sync channel frame out of the second sync channel frames in each said first sync channel frame with a first orthogonal code, and channel spreading sync channel signals in the remaining sync channel frames with a second orthogonal code.

2. The base station transmitter as claimed in claim 1, further comprising a complex multiplier for complex spreading the channel spread signal with a PN (Pseudo Noise) sequence, wherein a period of the PN sequence is identical to a period of the second sync channel frame.

3. The base station transmitter as claimed in claim 1, wherein the first sync channel frames each have a sync bit for acquiring frame sync.

4. The base station transmitter as claimed in claim 1, wherein the first sync channel frame has a period of 26.7 ms and the superframe of the sync channel has a period of 80 ms.

5. The base station transmitter as claimed in claim 1, wherein the second sync channel has a period of 8.89 ms.

6. A base station transmitter for a CDMA communication system including a superframe period of a sync channel and a plurality of sync channel frames segmented from the superframe period, the sync channel frames each having a first period, wherein sync channel signals are transmitted through the sync channel frames, the base station transmitter comprising:

a circuit for generating sync channel signals; and a channel spreader for channel spreading a sync channel signal in a leading sync channel frame out of the sync channel frames in the superframe of the sync channel with a first orthogonal code, and channel spreading sync channel signals in the remaining sync channel frames with a second orthogonal code.

7. The base station transmitter as claimed in claim 6, further comprising a complex multiplier for complex spreading the channel spread signal with a PN sequence, wherein a period of the PN sequence is identical to a period of the sync channel frame.

8. The base station transmitter as claimed in claim 6, wherein the superframe of the sync channel has a period of 80 ms, and the sync channel frame has a period of 8.89 ms.

9. A mobile station receiver for a CDMA communication system including a superframe period of a sync channel, a plurality of first sync channel frames segmented from the superframe period, the first sync channel frames each having a first period, and a plurality of second sync channel frames segmented from the first sync channel frames, the second sync channel frames each having a second period, wherein a sync channel signal in a leading sync channel frame out of the second sync channel frames in each said first sync channel frame is channel spread with a first orthogonal code, and sync channel signals in the remaining sync channel frames are channel spread with a second orthogonal code, the mobile station receiver comprising:

a channel despreader for channel despreading the sync channel signal in the leading sync channel frame out of the second sync channel frames in the first sync channel frame with the first orthogonal code, and channel despreading the sync channel signals in the remaining sync channel frames with the second orthogonal code; and a decider for determining a boundary of the first sync channel frame when the signal despread with the first orthogonal code exceeds a threshold, and detecting sync bits at the boundary of the first sync channel frame to acquire frame synchronization.

10. The mobile station receiver as claimed in claim 9, wherein the channel despreader comprises:

a first orthogonal code generator for generating the first orthogonal code at the second sync channel frame period in a leading frame period of the first sync channel frames;

a second orthogonal code generator for generating the second orthogonal code at the second sync channel frame period in the remaining frame period of the first sync channel frame; and a despreader for despreading the received sync channel signal with the first and second orthogonal codes output from the first and second orthogonal code generators.

11. The mobile station receiver as claimed in claim 10, further comprising a PN despreader for despreading the received channel signal with a PN sequence, wherein a period of the PN sequence is identical to a period of the second sync channel frame.

12. The mobile station receiver as claimed in claim 9, wherein the decider comprises:

an accumulator for accumulating an output of the channel despreader on a symbol unit basis; and a circuit for comparing a predetermined number of symbol accumulated-signals with a predetermined value.

13. The mobile station receiver as claimed in claim 9, wherein the superframe of the sync channel has a period of 80 ms, the first sync channel frame has a period of 26.7 ms, and the second sync channel frame has a period of 8.89 ms.

14. A mobile station receiver for a CDMA communication system including a superframe period of a sync channel, a plurality of sync channel frames segmented from the superframe period, the sync channel frames each having a first period, wherein a sync channel signal in a leading sync channel frame out of the sync channel frames in the superframe is channel spread with a first orthogonal code, and sync channel signals in the remaining sync channel frames are channel spread with a second orthogonal code, the mobile station receiver comprising:

a channel despreader for channel despreading the sync channel signal in the leading sync channel frame out of sync channel frames in the superframe with the first orthogonal code, and channel despreading the sync channel signals in the remaining sync channel frames with the second orthogonal code; and a decider for determining a boundary of the sync channel frame when the signal despread with the first orthogonal code exceeds a threshold, and detecting sync bits at the boundary of the sync channel frame to acquire frame synchronization.

15. The mobile station receiver as claimed in claim 14, wherein the channel despreader comprises:

a first orthogonal code generator for generating the first orthogonal code at a leading sync channel frame period of the superframe;

a second orthogonal code generator for generating the second orthogonal code at the remaining sync channel frame period of the superframe; and a despreader for despreading the received sync channel signal with the first and second orthogonal codes output from the first and second orthogonal code generators.

16. The mobile station receiver as claimed in claim 15, further comprising a PN despreader for despreading the received channel signal with a PN sequence, wherein a period of the PN sequence is identical to a period of the sync channel frame.

17. The mobile station receiver as claimed in claim 14, wherein the superframe of the sync channel has a period of 80 ms, and the sync channel frame has a period of 8.89 ms.

18. A sync channel signal transmission method for a base station transmitter in a CDMA communication system including a superframe period of a sync channel, a plurality of first sync channel frames segmented from the superframe period, the first sync channel frames each having a first period, and a plurality of second sync channel frames segmented from the first sync channel frames, the second sync channel frames each having a second period, wherein sync channel signals are transmitted through the second sync channel frames, the method comprising the steps of:

generating sync channel signals; and channel spreading a sync channel signal in a leading sync channel frame out of the second sync channel frames in each said first sync channel frame with a first orthogonal code, and channel spreading sync channel signals in the remaining sync channel frames with a second orthogonal code.

19. A sync channel signal transmission method for a base station transmitter in a CDMA communication system including a superframe period of a sync channel and a plurality of sync channel frames segmented from the superframe period, the sync channel frames each having a first period, wherein sync channel signals are transmitted through the sync channel frames, the method comprising the steps of:

generating sync channel signals; and channel spreading a sync channel signal in a leading sync channel frame out of the sync channel frames in the superframe of the sync channel with a first orthogonal code, and channel spreading sync channel signals in the remaining sync channel frames with a second orthogonal code.

20. A sync channel signal receiving method for a mobile station receiver in a CDMA communication system including a superframe period of a sync channel, a plurality of first sync channel frames segmented from the superframe period, the first sync channel frames each having a first period, and a plurality of second sync channel frames segmented from the first sync channel frames, the second sync channel frames each having a second period, wherein a sync channel signal in a leading sync channel frame out of the second sync channel frames in said each first sync channel frame is channel spread with a first orthogonal code, and sync channel signals in the remaining sync channel frames are channel spread with a second orthogonal code, the method comprising the steps of:

channel despreading the sync channel signal in the leading sync channel frame out of the second sync channel frames in the first sync channel frame with the first orthogonal code, and channel despreading the sync channel signals in the remaining sync channel frames with the second orthogonal code; and determining a boundary of the first sync channel frame when the signal despread with the first orthogonal code exceeds a threshold, and detecting sync bits at the boundary of the first sync channel frame to acquire frame synchronization.

21. A sync channel signal receiving method for a mobile station receiver in a CDMA communication system including a superframe period of a sync channel, a plurality of sync channel frames segmented from the superframe period, the sync channel frames each having a first period, wherein a sync channel signal in a leading sync channel frame out of the sync channel frames in the superframe is channel spread with a first orthogonal code, and sync channel signals in the remaining sync channel frames are channel spread with a second orthogonal code, the method comprising the steps of:

channel despreading the sync channel signal in the leading sync channel frame out of sync channel frames in the superframe with the first orthogonal code, and channel despreading the sync channel signals in the remaining sync channel frames with the second orthogonal code; and determining a boundary of the sync channel frame when the signal despread with the first orthogonal code exceeds a threshold, and detecting sync bits at the boundary of the sync channel frame to acquire frame synchronization.

\* \* \* \* \*